(12) United States Patent
Nobrega et al.

(10) Patent No.: US 7,292,996 B2
(45) Date of Patent: Nov. 6, 2007

(54) METHOD AND APPARATUS FOR PERFORMING A CREDIT BASED TRANSACTION BETWEEN A USER OF A WIRELESS COMMUNICATIONS DEVICE AND A PROVIDER OF A PRODUCT OR SERVICE

(75) Inventors: Ryan J. Nobrega, Belmont, CA (US); Vinod V. Valloppillil, Foster City, CA (US)

(73) Assignee: Openwave Systems Inc., Redwood City, CA (US)

( * ) Notice: Subject to any disclaimer, the term of this patent is extended or adjusted under 35 U.S.C. 154(b) by 1156 days.

(21) Appl. No.: 09/759,627

(22) Filed: Jan. 12, 2001

(65) Prior Publication Data

US 2002/0107791 A1 Aug. 8, 2002

Related U.S. Application Data

(60) Provisional application No. 60/238,760, filed on Oct. 6, 2000.

(51) Int. Cl.
*G06Q 40/00* (2006.01)
(52) U.S. Cl. .............................. 705/39; 705/40; 705/44
(58) Field of Classification Search .................. 705/39, 705/40, 44
See application file for complete search history.

(56) References Cited

U.S. PATENT DOCUMENTS

| | | | |
|---|---|---|---|
| 5,343,529 A | 8/1994 | Goldfine et al. | |
| 5,668,876 A | 9/1997 | Falk et al. | |
| 5,724,423 A | 3/1998 | Khello | |
| 5,915,022 A * | 6/1999 | Robinson et al. | 705/75 |
| 6,188,994 B1 * | 2/2001 | Egendorf | 705/40 |

(Continued)

FOREIGN PATENT DOCUMENTS

EP 0532231 A2 3/1993

(Continued)

OTHER PUBLICATIONS

Fabozzi, Frank J., ed. Handbook of Structured Financial Products. 1998. John Wiley & Sons, Inc. (4 pages).*

(Continued)

*Primary Examiner*—James A Kramer
*Assistant Examiner*—Jennifer Liversedge
(74) *Attorney, Agent, or Firm*—Blakely Sokoloff Taylor & Zafman LLP

(57) ABSTRACT

A wireless telecommunications carrier operates a commerce platform in a trusted domain, which may store sensitive information associated with a consumer. During a credit card based transaction, a merchant's POS terminal sends transaction information to an acquirer. The acquirer recognizes the transaction type and responds by routing the transaction information to the commerce platform. The commerce platform validates the transaction by verifying the identity of the user. When the transaction is validated, the commerce platform notifies the acquirer, which initiates a clearing process. When the transaction clears, the acquirer notifies the commerce platform and signals the merchant's POS terminal to output a paper receipt. The commerce platform stores a digital receipt of the transaction and signals the wireless device to output a confirmation message to the consumer. The consumer's credit card number and other sensitive information may be restricted to the trusted domain, which excludes the merchant.

25 Claims, 9 Drawing Sheets

U.S. PATENT DOCUMENTS

| | | | |
|---|---|---|---|
| 6,490,443 B1 * | 12/2002 | Freeny, Jr. | 455/406 |
| 6,609,113 B1 * | 8/2003 | O'Leary et al. | 705/39 |
| 6,664,922 B1 | 12/2003 | Fan | |
| 6,868,391 B1 * | 3/2005 | Hultgren | 705/26 |
| 2003/0065805 A1 | 4/2003 | Barnes, Jr. | |

FOREIGN PATENT DOCUMENTS

| | | | |
|---|---|---|---|
| EP | 0745961 A2 | | 12/1996 |
| WO | WO96/13814 | * | 5/1996 |
| WO | WO96/13814 A1 | | 5/1996 |
| WO | WO96/13814 | * | 9/1996 |
| WO | WO99/23617 A2 | | 5/1999 |

OTHER PUBLICATIONS

Muller, Nancy. American Express Introduces New Corporate Service with MCI. PR Newswire. New York, Nov. 19, 1992. (3 pages).*

Lucas, Peter. Why Some Want to Spank the Baby Bells. Credit Card Management. New York, Apr. 1992. vol. 5, Iss. 1., pg. 70. (6 pages).*

US West Hopes to Ring Up New Business with a Cobranded Card. Credit Card News. Chicago, May, 1, 1993, Iss. 26. (2 pages).*

Ameritech Unplugs the Original Baby Bell Cobrand Card. Credit Card News. Chicago, May 1, 1998. (3 pages).*

"Aether Systems and MICROS Form Alliance To Develop Wireless Technology Applications for the Hospitality Industry", Owings Mills, MD and Columbia, MD, Jul. 27, 2000.

Alan Young, "e-Citi Wireless Financial Services", Meeting of the Electronic Payments Forum, New York, NY, Sep. 13, 2000, downloaded from http://www.epf.net/PrevMtngs/Sep00/Sep00Meeting.html.

Jacob M. Goldman, "E-Commerce Goes Mobile", Oct. 2000, downloaded from http://www.epf.net/PrevMtngs/Sep00/Sep00Meeting.html.

John Wankmueller, "MasterCard Mobile Commerce, WAP and Other Standards," Meeting of Electronic Payments Forum, New York, NY, Sep. 13, 2000, downloaded from http://www.epf.net/PrevMtngs/Sep00/Sep00Meeting.html.

Ian Dysdale, "Electroni Payments Forum," Meeting of the Electronic Payments Forum, New York, NY, Sep. 13, 2000, downloaded from http://www.epf.net/PrevMtngs/Sep00/Sep00Meeting.html.

Ian Drysdale, "New Way to Pay", Dec. 25, 2000, Interactive Week, http://www.zdnet.com/intweek/stories/news/0,4164,2668862,00.html.

* cited by examiner

METHOD AND APPARATUS FOR PERFORMING A CREDIT BASED TRANSACTION BETWEEN A USER OF A WIRELESS COMMUNICATIONS DEVICE AND A PROVIDER OF A PRODUCT OR SERVICE

This application claims the benefit of U.S. Provisional Patent Application No. 60/238,760, filed on Oct. 6, 2000, and entitled, "Using the Phone for POS Transactions", which is incorporated herein by reference.

FIELD OF THE INVENTION

The present invention pertains to the use of wireless communication devices in executing credit card transactions. More particularly, the present invention relates to using wireless communication devices in executing credit card transactions in a manner which reduces the risk of fraudulent transactions.

BACKGROUND OF THE INVENTION

Consumers have grown accustomed to using credit cards to purchase goods and services. Although credit cards provide significant advantages and convenience over cash transactions, various costs are associated with credit card transactions. A major factor in determining the cost of a credit card transaction is risk, and particularly, the risk of fraud. These costs may be imposed upon merchants and consumers in the form of use charges, annual fees, and/or higher interest rates.

There are several different ways in which a consumer can purchase goods or services using a credit card, each of which has a certain amount of fraud risk associated with it. In the traditional credit card transaction, the consumer (the credit card holder) is present at the merchant's (provider of goods or services) place of business and physically presents the card to the merchant when paying for the goods or services. The consumer physically signs a paper receipt confirming the transaction. Another common type of credit card transaction type is mail order or telephone order. In this scenario, nothing is physically signed by the consumer, and the credit card is not physically present at the merchant. Consequently, this type of a credit card transaction generally involves a greater risk of fraud than an in-person transaction. Another type of credit card transaction which recently has become much more common is the online (Internet) purchase. In this case as well, nothing is physically signed by the consumer, and the credit card is not physically present at the merchant. Although substantial progress has been made in the areas of data encryption and Internet security in general, this method of payment is still viewed by many as involving the greatest risk of all the types of credit card transactions.

The parties potentially affected by credit card fraud include the consumer (the credit card holder), the provider of goods or services (the "merchant"), the issuer (the bank which issued the credit card), the acquirer (the bank which directly interfaces with the merchant for purposes of processing a credit card transaction; often the same entity as the issuer), and the clearing network (e.g., MasterCard or Visa). These parties may be exposed to fraud in any of several ways. First, a criminal posing as a credit card account holder may make fraudulent purchases on a stolen credit card account number. Currently, the point of origin for most of the fraud risk associated with a credit card is at the transition where the credit card is delivered from the issuer to the consumer. In addition, signatures may be forged, enabling a criminal to impersonate a legitimate credit card account holder. The transaction can be completed even if the merchant fails to check the signature or back up identification of the consumer. Furthermore, an acquirer must trust the information it receives from the merchant. Consequently, a criminals posing as a merchant may run transactions on a stolen credit card number. Also, a criminal working for a legitimate merchant may falsify the amount of the legitimate purchase. The transaction can also be completed even if the consumer does not verify that the transaction is for the correct amount, enabling a criminal to run a fraudulent transaction amount. In addition, a consumer may repudiate a valid transaction. In the online scenario in particular, is very difficult to prove that the consumer approved the transaction.

Credit card fraud creates expense for credit card networks, their banks, and consumers. Reducing the incidence of fraud in credit card transactions will help to save money and, in turn, to reduce use charges for merchants and consumers and enable new credit card services. A new credit card payment system, therefore, should work within, and preferably improve upon, existing risk tolerance levels and other constraints associated with more conventional credit card transactions.

Furthermore, a new credit card payment system should not require significant added hardware or changes to existing merchant credit card authorization/clearing procedures, or require significant effort or training for merchants and consumers.

SUMMARY OF THE INVENTION

The present invention includes a method and apparatus for facilitating a credit based transaction between a consumer and a provider of a product or service. The method comprises a telecommunications carrier providing telecommunications services to users of wireless communications devices on a wireless communications network, including the consumer, and validating the credit card transaction between the consumer and the provider. The carrier may receive a portion of the revenue associated with credit card transactions.

In another aspect of the present invention, a method and apparatus for facilitating a credit based transaction between a consumer and a provider of a product or service includes storing credit account information of the consumer within a trusted domain which excludes the consumer and the provider. The credit account information is used to validate the transaction between the consumer and the provider, such that the stored credit account information is not sent outside the trusted domain at any time in relation to the transaction. The method may be performed by a wireless telecommunications carrier, which may receive a portion of the revenue associated with credit card transactions.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
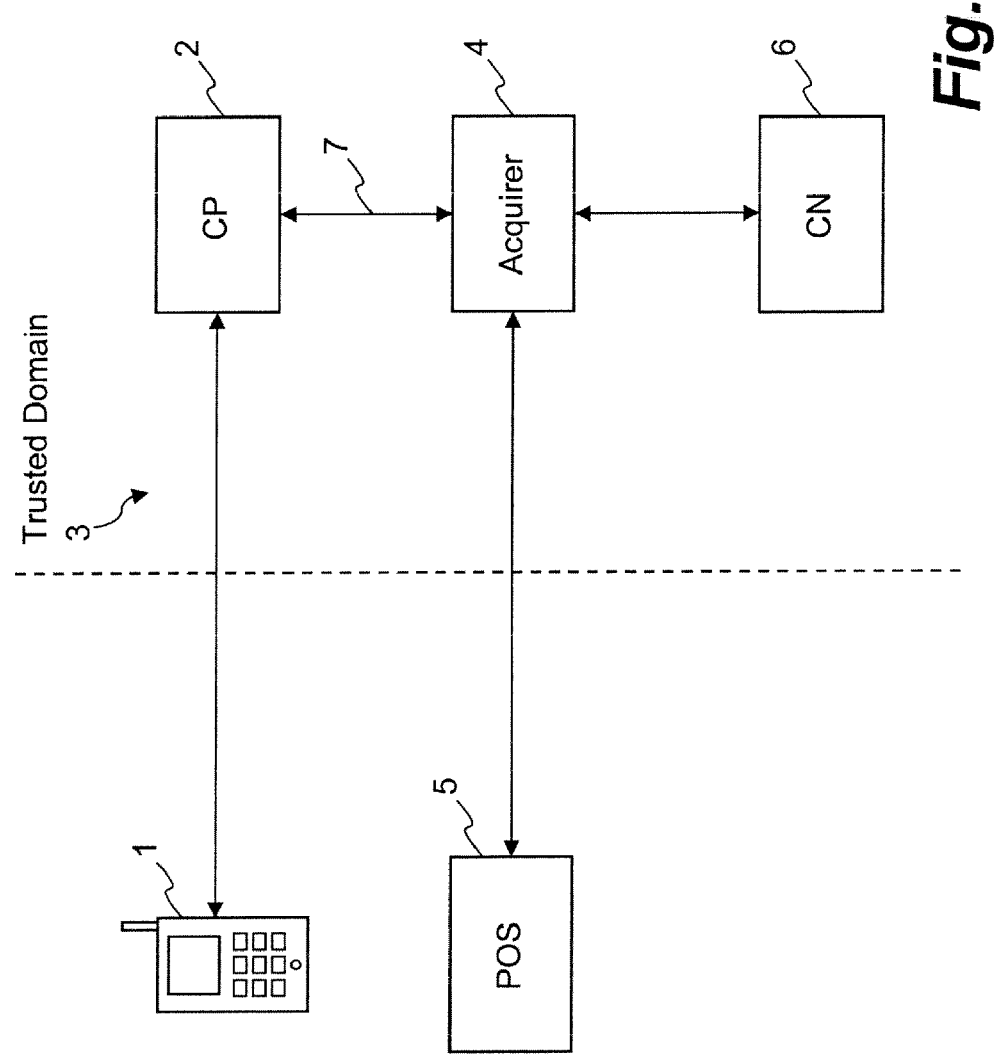
FIG. 1 is a block diagram illustrating the entities and the environment associated with performing a credit card transaction using a wireless device in accordance with the present invention.

A method and apparatus for performing a credit card transaction between a merchant and a consumer using a wireless communications device are described. A "merchant" is defined herein to mean a provider of goods and/or services. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

The techniques described herein provide a new modality of credit card payment that can benefit all parties involved in a credit card transaction. The described techniques help to substantially reduce the risk of fraud associated with credit card transactions and, accordingly, to reduce the costs associated with credit card transactions. In addition, the described techniques are amenable to quick and widespread acceptance in the marketplace, since they require little or no additional hardware, no significant changes to merchant authorization and clearing procedures, and little or no effort or training of merchants and consumers.

As described in greater detail below, the techniques provided herein enable a wireless telecommunications network operator ("wireless carrier") to validate the identities of credit card users who use wireless devices such as cellular telephones (and who therefore subscribe to the carrier's service), and to ensure that the credit card users approve the transactions and receive receipts for the transactions. A wireless carrier has the capability to identify a cellular telephone (or other wireless device) and its user as part of providing its telecommunications services. Therefore, when a credit card transaction is conducted in part by using the wireless device on the carrier's network, the carrier can: 1) authenticate and account holder's identity independently and redundantly to existing credit card purchase processes; 2) require that proposed credit card purchases only be executed if they are agreed to by the true credit card account holder; and 3) validate that the wireless device involved in a proposed credit card transaction is located in the same geographic area as the proposed transaction.

For performing this validation process and thereby accepting a portion of the associated risk/liability, a wireless carrier may also receive a portion of the revenue associated with the credit card transactions it validates. This remuneration may be provided through a business arrangement for providing the validation services. For example, the credit card issued to the consumer may be the wireless carrier's co-branded Visa, Mastercard, etc. Accordingly, a percentage of the transaction amount, which typically would have been allocated entirely to the issuer, might now go to the wireless carrier. This approach is a significant departure from the risk/revenue allocation model associated with conventional credit card transactions. Of course, it will be recognized that the validation process described herein does not have to be performed by a wireless carrier and could be performed by many other types of entity or enterprise.

To accomplish the above-mentioned tasks, as described in greater detail below, an entity such as a wireless carrier maintains, owns and/or operates a commerce platform within a "trusted domain". In certain embodiments, the commerce platform stores the consumer's credit card account information and other personal information on the consumer, for purposes of validating the identity of the consumer. The merchant's point of sale (POS) terminal sends transaction information to the acquirer at the time of purchase. Based on this information, the acquirer recognizes the transaction type and responds by routing the transaction information to the commerce platform. The commerce platform may receive, for example, a personal identification number (PIN) or the like, input by the consumer at the wireless device, which the commerce platform may use in association with the stored information to verify the identity of the consumer. Note that a wireless carrier also has other ways of validating user identity for a credit card transaction besides using a PIN, such as based on its knowledge about the legitimacy of the wireless device being used and correlations between the wireless device and the issued card.

When the consumer's identity is validated, the commerce platform passes the consumer's account information (credit card number, expiration date, etc.) to the acquirer, which is also located within the trusted domain. The acquirer forwards the information to a clearing network within the trusted domain.

When the transaction clears, the acquirer notifies the commerce platform and signals the merchant's point of sale (POS) terminal to generate a conventional paper receipt confirming the transaction. In response, the commerce platform stores a digital receipt of the transaction, which the consumer may access online using the wireless device or any other computing device having online access capability. The commerce platform may also signal the wireless device to output a confirmation message to the consumer.

To be viable, a new credit card payment system must work within existing constraints associated with processing merchant credit transactions. Some of these constraints are related to attitude in the marketplace; that is, they are a consequence of the decades of entrenched merchant behavior and hardware equipment in the field. Others are economic and related to the structure of the credit card economy. For example, one factor which affects any potential solution is the desirability of leveraging the credit card value chain. A large part of the reason credit cards have the presence they enjoy today is that there are potentially five players in every transaction (consumer, merchant, acquirer, clearing network, and issuer), each of whom has incentive to widen the network and make transactions viable. In particular, the acquiring bank representing the merchant provides a point interface into potentially thousands of downstream merchants. Creating solutions and processes that target the acquiring bank simultaneously provides them with incentive and reduces system-wide deployment hurdles.

Another factor is the desirability of integrating current merchant authorization and clearing procedures. The credit card networks have invested enormous amounts of time and effort in educating merchants about the complex process of recognizing credit card revenue. POS terminals in particular have a large, deeply entrenched role in merchant procedures. For many retail merchants, the POS terminal is the primary (if not exclusive) accounting system for the company. A third factor is authentication and risk management. The credit industry is one of the most sophisticated consumers of risk management technologies in the world. Fine-grained actuarial tables precisely outline the costs of credit transactions across various channels (e.g., mail order vs. in-person transaction).

To gain acceptance, therefore, a system must not exceed current industry tolerances for risk and, ideally, should reduce risk. A system whose risk can be managed within current risk modeling parameters is preferred. In addition, a new credit card payment system should be easily deployable and should require little effort by, and education of, merchants and consumers.

One potential solution is the Local Proximity approach. In this approach, a cellular phone converses with the merchant's POS using short-range wireless technologies such as Blue Tooth, infrared (IR), or contactless chips. A benefit of this approach is that it would work with current merchant systems for authorization and clearing of transactions. A disadvantage, however, is that it would require introduction of new hardware to merchants that wish to participate.

Another potential solution is the "merchant electronic storefront". In this approach, the cellular phone would interact with a website belonging to a merchant (or perhaps a group of merchants) and electronically transact with this electronic storefront. A benefit of this approach is that it does not require new hardware at the merchant's location. A disadvantage is that it creates an entirely new authorization/clearing system for merchants. Most merchants currently do not have an electronic commerce ("e-commerce") infrastructure, and those that do typically handle product fulfillment, support, etc. in a manner completely separate from their physical-world efforts.

Yet another potential solution is the "merchant mall". This is a permutation of the above approach, in which a third party (such as the acquiring bank) handles the construction of the merchant storefront and centrally manages it. While this solution solves the problem of storefront deployment, it does not solve the problem of integrating authorization and fulfillment.

The solution provided herein (as henceforth described in greater detail) overcomes these disadvantages. The solution provided herein offers additional risk-reducing opportunities which make it an attractive solution to all risk-bearing parties involved in a credit card transaction. Sensitive user information can be entirely secured within the trusted domain, in contrast with conventional credit card transactions. The techniques described herein offer, in a single solution (if so implemented), the following risk-reducing features, all of which no previous single solution provides: paper receipt; digital receipt; opportunity for ink signature (if desired); digital signature; digital verification of signature; verification of consumer identity; ability to use "hidden" credit card data; and, independent initiation, verification, and approval of the transaction by the merchant and the consumer. Of course, particular embodiments of the techniques described herein need not incorporate all of these features/benefits and do not have to do so to provide value.

The techniques of the present invention integrate easily and relatively seamlessly with current merchant processes, while requiring little or no additional hardware. Merchants are thereby enabled to retain their existing processes and equipment while deriving the benefit of accepting payments through a new modality.

Refer now to FIG. 1, which illustrates the entities and the environment associated with performing a credit card transaction using a wireless device, in accordance with the present invention. The consumer uses a wireless communication device 1 during the credit card transaction. The wireless device 1 may be, for example, a cellular telephone, as is sometimes assumed in this description to facilitate explanation. It will be recognized, however, that the wireless device 1 could alternatively be essentially any other type of wireless communication device, such as a personal digital assistant (PDA), a two-way pager, or the like. It may be assumed that the wireless device 1 includes browser software (sometimes referred to as a minibrowser or microbrowser in a hand-held wireless device). The wireless device 1 communicates with a commerce platform (CP) 2, which is located within a "trusted domain" 3, via a secure channel. Information on the consumer is stored in the commerce platform 2 in a secure manner, and provided to the acquirer 4, which is also located within the trusted domain 3, when the identity of the consumer has been verified. The trusted domain 3 is a domain in which the consumer is credit card account information and other confidential/personal information of the consumer is maintained. The trusted domain 3 excludes the merchant and the consumer. In certain embodiments, the credit card account information and other personal information of the consumer is never allowed to leave the trusted domain 3 during, or in connection with, the transaction. At the merchant's place of business, transaction information is entered into the merchant's POS terminal 5. The merchant's POS terminal 5 interfaces directly with the acquirer 4.

During a traditional credit card transaction, the merchant's POS terminal sends transaction information to the acquirer. During an in-person credit card transaction, this process is typically initiated by swiping the consumer's credit card through a magnetic stripe reader in the merchant's POS terminal. Otherwise, the credit card number may be simply typed into a numeric keypad on the POS terminal. The information transmitted to the acquirer normally includes the consumer's credit card number, expiration date, amount of the transaction, an identifier of the merchant, and an identifier of the acquirer. The acquirer routes this information to a clearing network (e.g., MasterCard or Visa), which determines whether the transaction is authorized based on, among other things, the amount of credit currently available to the consumer. If the transaction is authorized by the clearing network, the acquirer signals this fact to merchant's POS terminal, which prints a paper receipt of the transaction. The receipt is then signed by the consumer to complete the transaction. (Not shown in FIG. 1 is the issuer of the credit card.)

In contrast, a credit card transaction in accordance with the present invention uses independent actions of both the consumer (using a wireless device) and the merchant (normally using a POS terminal). That is, the merchant and the consumer independently initiate, verify and approve transaction. Whereas previously the merchant would be in complete control of the transaction once the consumer had communicated the credit card information, the consumer is now involved in the initiation and approval of the transaction.

The merchant's point of sale POS terminal 5 sends transaction information to the acquirer 4 in a manner that is essentially the same as done today. However, the information sent to the acquirer 4 by the merchant's POS terminal 5 does not include the consumer's credit card information, because that information is never provided to the merchant. Based on the information it receives from the POS terminal 5, the acquirer 4 recognizes that the transaction is of a predetermined type, i.e., a transaction is to be processed using a wireless device, as opposed to a conventional credit card transaction. Upon recognizing this fact, the acquirer 4 responds by routing the received transaction information to the commerce platform 2 over a dedicated, secure channel 7 between these two parties. All communications between the acquirer and the commerce platform, as described further below, are encrypted and carried out over the dedicated, secure channel 7.

Concurrently, in one embodiment, the commerce platform 2 receives a PIN input by the consumer at the wireless device 1 and uses the PIN and stored information associated with the consumer to verify the identity of the consumer. The consumer's PIN is encrypted and non-retrievable. The PIN does not have to consist of purely numeric characters; a PIN can be a combination of alphabetic characters and numerals, or even purely alphabetic characters. When the consumer's identity is verified, the commerce platform 2 passes the consumer's account information (e.g., credit card number and expiration date) to the acquirer 4. The acquirer 4 then forwards the information to the clearing network (CN) 6 within the trusted domain 3. When the transaction clears, the acquirer 4 notifies the commerce platform 2 of this fact and signals the merchant's POS terminal 5 to generate a conventional paper receipt confirming the transaction. Concurrently with this action by the acquirer 4, the commerce platform 2 stores a digital receipt of the transaction and signals the wireless device 1 to output a confirmation message to the consumer. The consumer may access his stored digital receipts online using the wireless device or any other computing device having online access capability, using for example a Web site interface.

The commerce platform 2 may be implemented in one or more conventional computer systems, such as one or more personal computers (PCs) and/or workstations. In an embodiment in which the commerce platform 2 is formed by multiple computer systems, such computer systems may be coupled to each other on a network, such as a local area network (LAN), wide area network (WAN), or even over the Internet if a secure communication link is used.

In one embodiment, the commerce platform 2 also provides the consumer with a personalized, password-protected portal to a shopping software application, which the consumer accesses using the wireless device, to initiate the credit card transaction. Note that the consumer can also potentially access this portal using any other type of computer system with online capability.

As noted, the commerce platform 2 may be maintained and operated by the wireless carrier which provides telecommunications services to the wireless device 1 involved in the credit card transaction. Accordingly, the wireless carrier may receive a portion of the revenue associated with the transactions it validates, in exchange for accepting a portion of the risk/liability. Note, however, that many of the operations of the commerce platform 2 described herein do not have to be performed by a wireless carrier; essentially any other entity or enterprise could perform such operations. Hence, a commerce platform 2 such as described herein can potentially be maintained and operated by any entity or enterprise. It will be understood that references in this description to the commerce platform being maintained, owned and/or operated by a wireless carrier are for purposes of explanation only.

On the other hand, a wireless carrier is in a position to add significant value to a credit card payment system, by virtue of its unique relationship with users of wireless devices. Therefore, it may be desirable that the commerce platform be operated by a wireless carrier. Nonetheless, a wireless carrier may perform validation procedures such as described herein without necessarily using a commerce platform exactly as described herein.

In addition, note that aspects of the present invention can be applied without securing the credit card account information of the consumer within a trusted domain. For example, a commerce platform such as described herein may be used to facilitate a credit card transaction using a wireless device, even though the credit card information may be provided by the consumer directly to the merchant (i.e., in the traditional manner). In that case, the commerce platform still serves to "link" the independent actions of the merchant and the actions of the consumer for purposes of carrying out the transaction.

Figure 2:
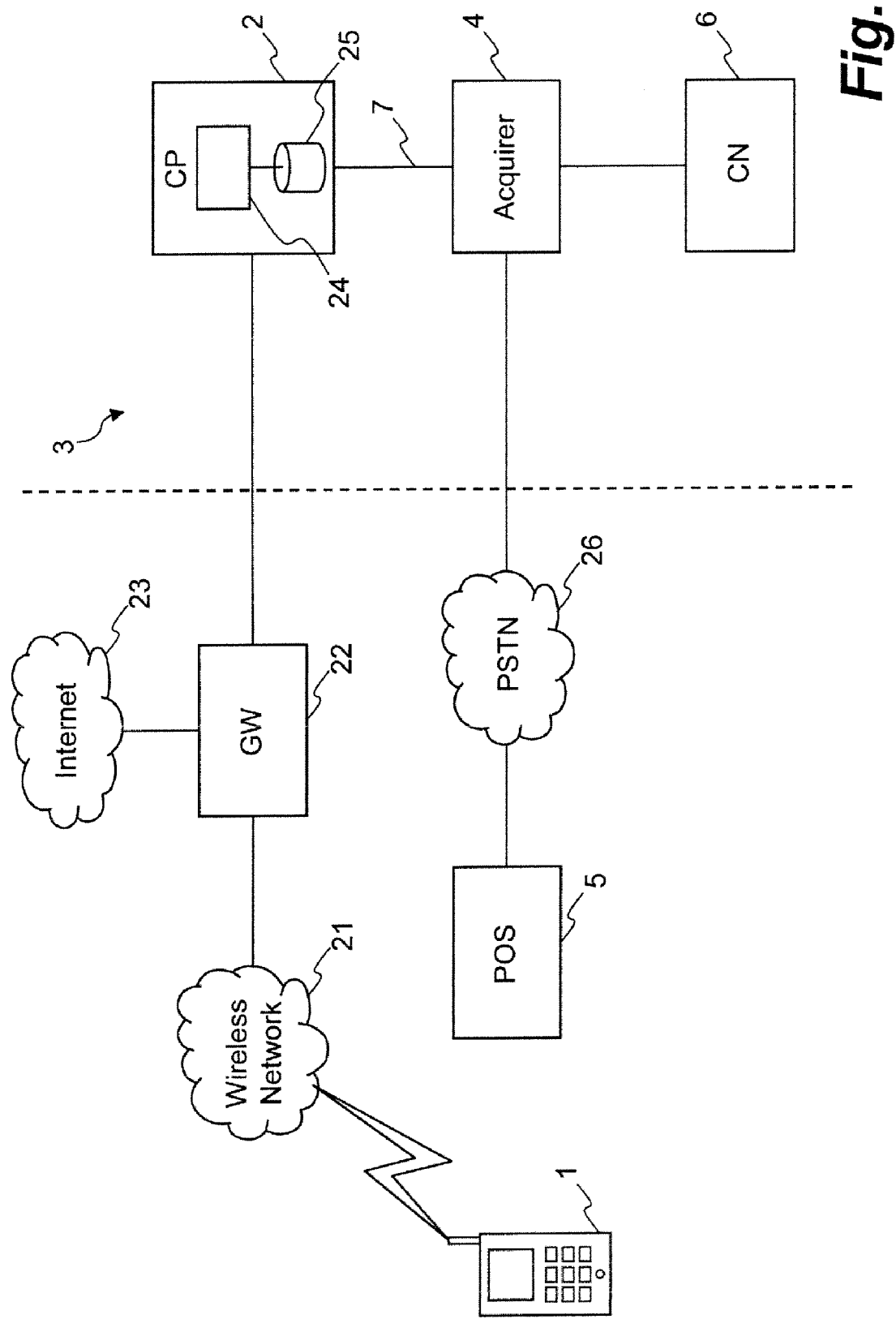
FIG. 2 illustrates the environment of FIG. 1 in greater detail, according to one embodiment.

FIG. 2 illustrates the environment of FIG. 1 in greater detail, according to one embodiment. It will be recognized that various other embodiments are possible. As shown, the cellular phone 1 communicates with the commerce platform 2 via a wireless communications (e.g., cellular telephone) network 21 and a gateway server 22. The gateway server 22 connects the wireless network 21 to the commerce platform 2.

In one embodiment, a primary function of the gateway server 22 is to provide a connection between the wireless network 21 and the Internet 23. This interface allows wireless devices such as cellular phones to access the World Wide Web, send and receive electronic mail (e-mail), etc. The gateway server 22 may be implemented as one or more conventional PCs and/or workstations. To provide the aforementioned functions, the gateway server 22 may include and execute software such as the UP.Link WAP Server Suite, available from Openwave Systems, Inc. of Redwood City, Calif.

The cellular telephone 1 may communicate with the wireless network 21 using, for example, Wireless Access Protocol (WAP). The wireless network 21 may communicate with the gateway server 22 using, for example, the Signaling System 7 (SS7) protocol. The gateway server may communicate with other devices on the Internet using, for example Internet protocol (IP) and/or Hypertext Transfer Protocol (HTTP). The commerce platform may communicate with the gateway server using the same or similar protocols. The connection between the commerce platform and the gateway server may be a direct connection or a connection via a network (e.g. a LAN).

The commerce platform 2 includes software 24 and a database 25 which contains credit card account information, PINs, and other personal information of multiple credit card holders (consumers). If the commerce platform 2 is operated by the wireless carrier (i.e., the operator of wireless network), the information in the database 25 may be limited to the aforementioned information for only the cardholders who subscribe to the wireless carrier's services. The software 24 within the commerce platform 2 enables it to perform the identity verification operations described above.

In one embodiment, the software 24 within the commerce platform 2 includes a portal built on top of the MyPhone system, available from Openwave Systems, Inc. The MyPhone system provides a mobile portal platform and a suite of value-added communication applications and personal information management (PIM) applications that enable development of next generation universal access Internet portals. The portal provides the consumer with access to an e-commerce (shopping) software application, which may also reside and/or execute in the commerce platform 2.

The merchant's POS terminal 5 communicates with the acquirer 4 through a standard dial-up connection through, for example, the public switched telephone network (PSTN) 26. The commerce platform 2 communicates with the acquirer 4 over a secure, dedicated channel 7. The secure, dedicated channel 7 may be a virtual private network (VPN) connection on and otherwise nonsecure public network, such as the Internet 23.

Figure 3A:
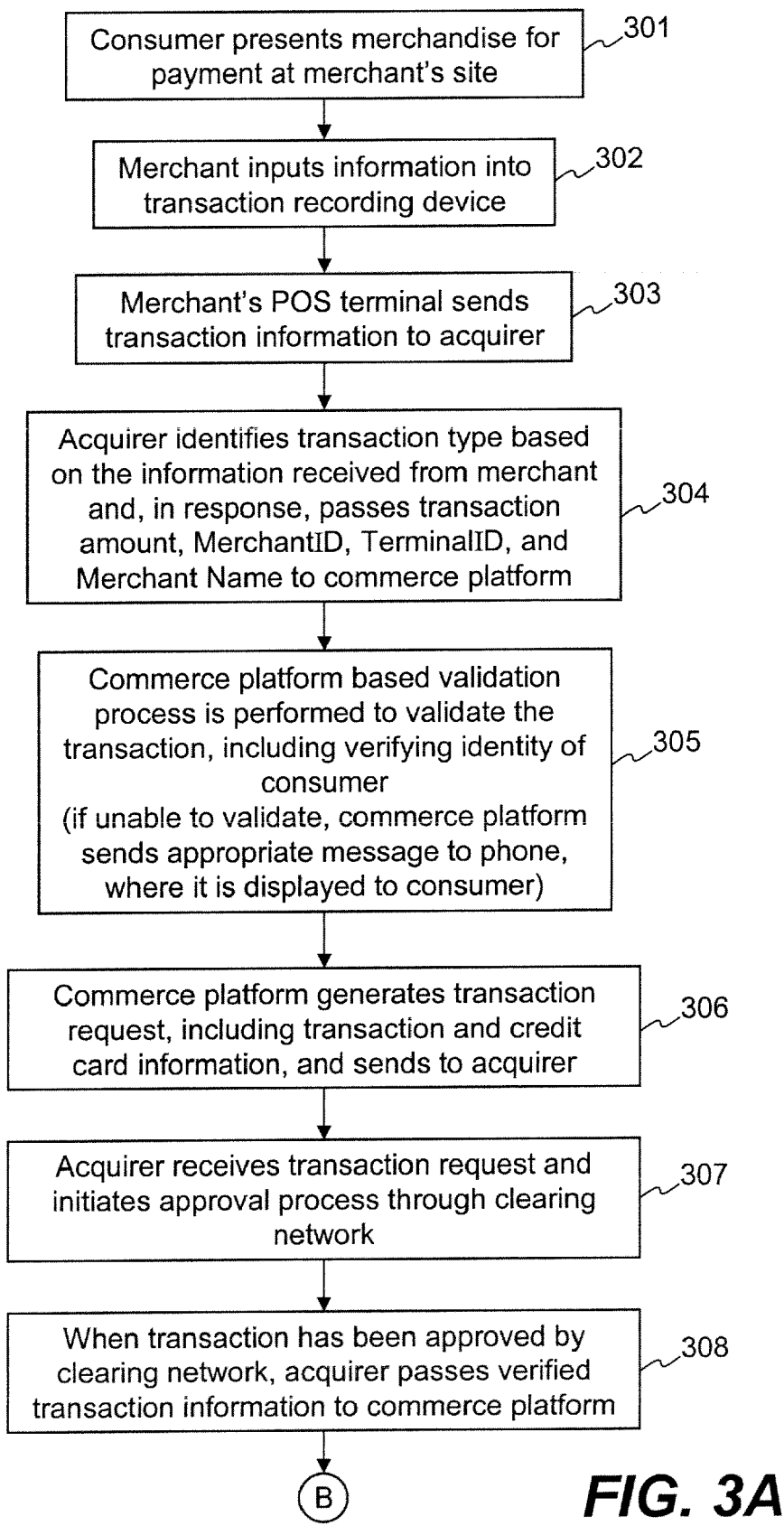
FIGS. 3A and 3B collectively form a flow diagram showing the overall process of performing a credit card transaction in accordance with the present invention.
Figure 3B:
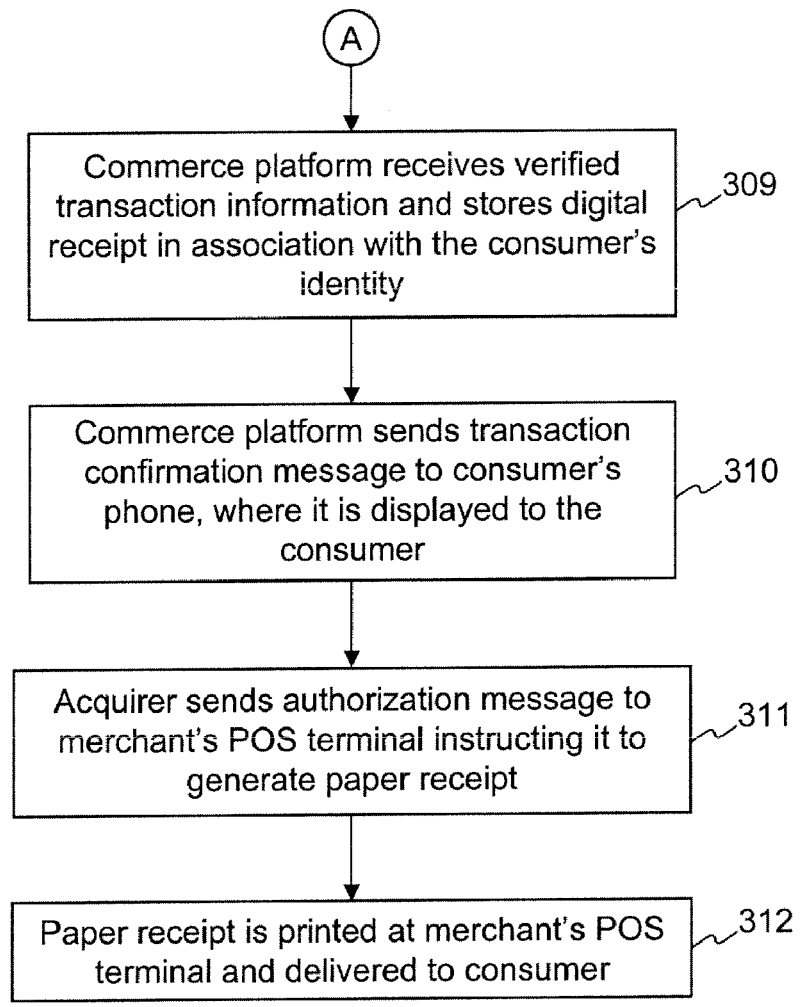

The overall process of performing a credit card transaction according to the present invention is now further described with reference to FIGS. 3A and 3B, which illustrate one embodiment of such a process. At processing block 301, the consumer initially presents merchandise for payment at a checkout location at the merchant's place of business. At block 302, the merchant inputs information into a conventional transaction recording device, such as a bar code scanner, cash register, or notepad. When the merchant asks the consumer for the method of payment, the consumer informs the merchant the merchandise will be paid for using the consumer's phone. Note that the consumer does not present a credit card or communicate his credit card number to the merchant at this time or at any other time during the transaction. Next, at block 303, the merchant's POS terminal sends transaction information to the acquirer. The contents of this transmitted information can vary from embodiment to embodiment, as discussed below. However, this information normally includes some type of indicator which allows the acquirer to identify this transaction as one which will be performed using the consumer's phone. Next, at block 304, the acquirer identifies the transaction type based on the information received from the merchant, and responds by passing the transaction amount, a unique identifier of the merchant (MerchantID), a unique identifier of the merchant's POS terminal (TerminalID), and the merchant's name (Merchant Name) to the commerce platform over the secure, dedicated channel. The Merchant Name may be stored at the acquirer such that it can be looked up if the MerchantID is provided.

Next, at block 305, the commerce platform stores the transaction information and validates the transaction by verifying the consumer's identity, in a manner described below. (If the commerce platform is unable to validate the transaction, it sends an appropriate denial-of-transaction message to the consumer's phone, where the message is displayed to the user.)

Assuming the transaction is validated, at block 306, the commerce platform generates and sends to the acquirer a transaction request on behalf of the merchant and the consumer. The transaction request includes the stored transaction information and the consumer's credit card account number and expiration date. The transaction request also includes a unique identifier of the acquirer, which is used for routing purposes to specify which acquiring organization should receive the transaction request. Because all relevant transactional data is now known to the commerce platform, the transaction appears from the acquirer's point of view essentially like any standard transaction initiated at a POS using a traditional credit card.

Figure 6C:
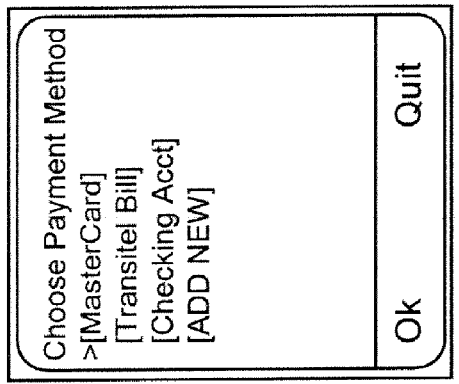
FIGS. 6A through 6E show a series of screens which may be displayed on a cellular telephone or the like during a credit card based transaction in accordance with the present invention.
Figure 6B:
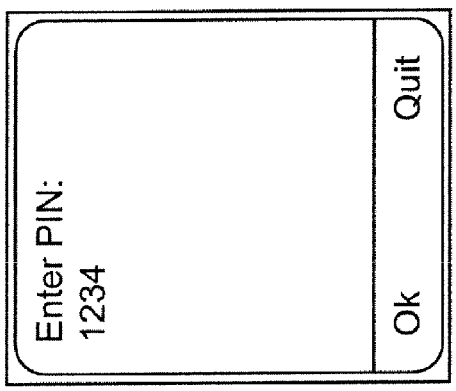
Figure 6A:
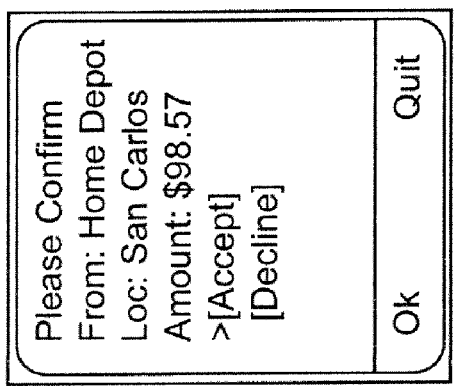

At block 307, the acquirer receives the transaction request and, as with any other transaction request, initiates the approval process through the clearing network. While the transaction is being processed, the commerce platform may send a message to the cellular phone to cause the phone to display a message to the consumer indicating that the transaction is pending, such as the message shown in FIG. 6D.

Figure 6E:
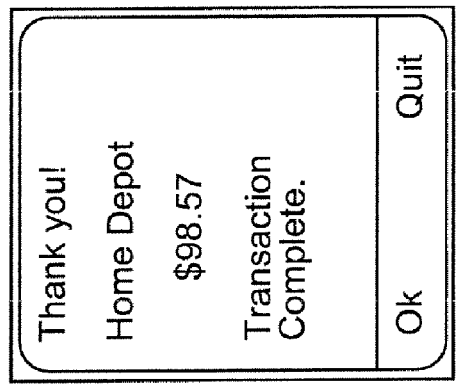
Figure 6D:
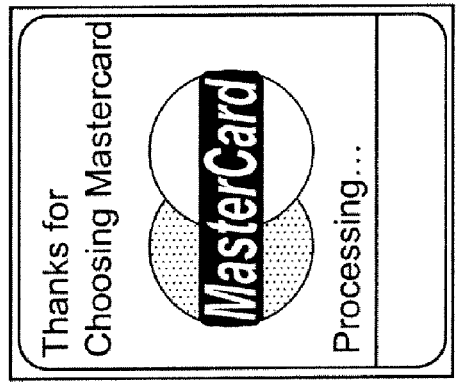

Assuming the transaction is approved by the clearing network, then at block 308, the acquirer passes information indicating the transaction has been cleared, including an approval authorization number and amount, to the commerce platform. Because the acquirer has previously identified this transaction as a phone based transaction, and the transaction was initiated over the secure channel by the commerce platform, the acquirer recognizes that the verified transaction information must be forwarded to the commerce platform. When the commerce platform receives this information, it stores a digital receipt of the transaction in association with the identity of this consumer/portal user at block 309. As noted, this digital receipt can then be accessed by the consumer using the browser on the cellular phone or any other computer system. At block 310, the commerce platform sends, via the wireless network, a message confirming completion of the transaction to the consumer's phone, where the confirmation message is displayed to the consumer. An example of the confirmation message is shown in FIG. 6E. In addition, as in a conventional credit card transaction, at block 311 the acquirer sends a signal to the merchant's POS terminal, including the approval authorization number and amount, indicating that the transaction has cleared and instructing it to generate a paper receipt. At block 312, the merchant's POS terminal prints the paper receipt, which is delivered to the consumer.

The process is complete at this point. Note that in contrast with a conventional in-person credit card transaction, the consumer's physical (pen and ink) signature is not required. Note, however, that the opportunity for the merchant to obtain the consumer's physical signature is still present, since a paper receipt is printed. Therefore, the merchant can obtain a physical signature if desired. However, with this technique, a physical signature would likely provide little or no added value.

Figure 4A:
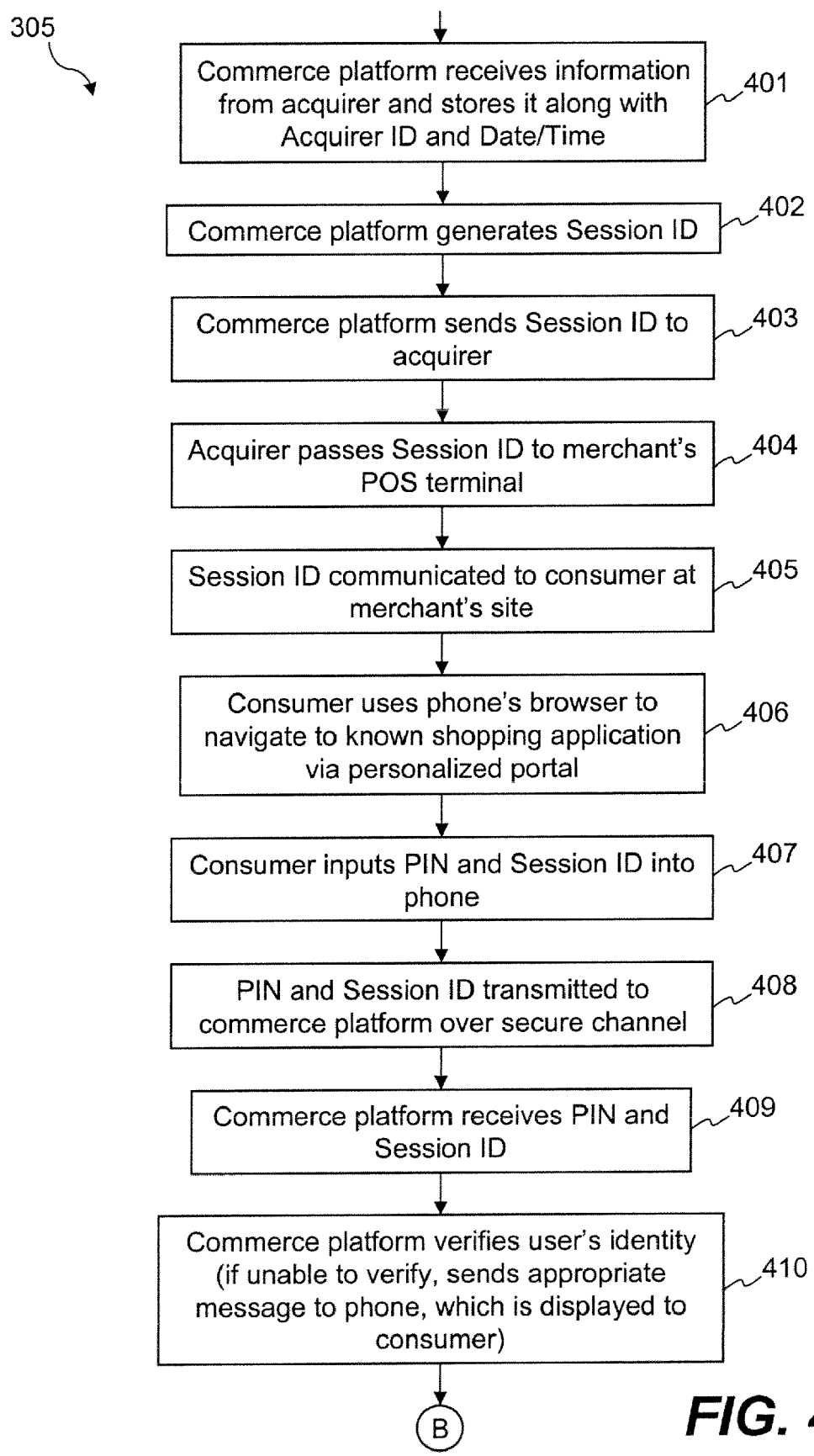
FIGS. 4A and 4B collectively form a flow diagram showing in greater detail the validation process performed by the commerce platform, according to a first embodiment.
Figure 4B:
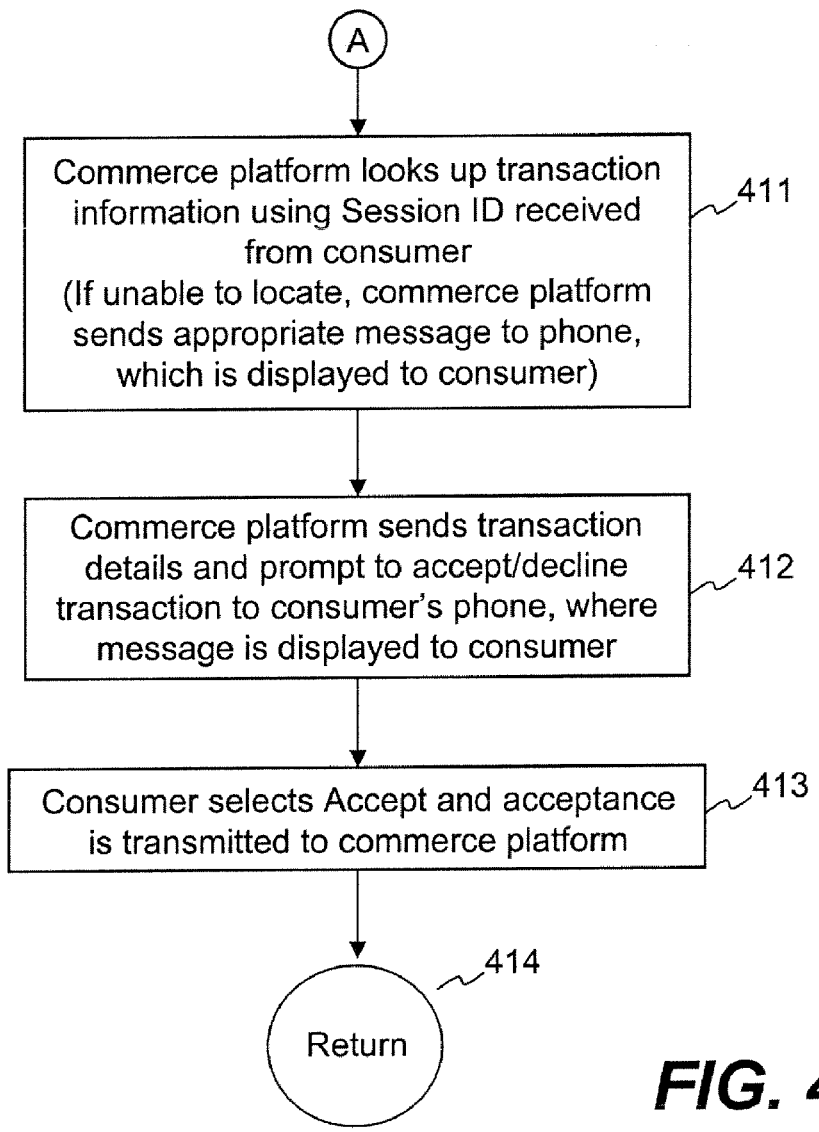

FIGS. 4A and 4B collectively show in greater detail the validation process (block 305) performed by the commerce platform, according to one embodiment. In this embodiment, the merchant enters a pre-defined transaction type identifier (e.g., "type=phone") into the POS terminal to signify that: 1) the consumer's identity has not yet been identified/verified; and 2) a wireless application will be used to provide and/or verify identity and transaction data. The transaction type identifier may be input by the merchant in place of a credit card number. The transaction may look something like the following when viewing the display of the merchant's POS terminals:

POS: "Slide Card or Enter Card #"
MERCHANT input: 2211 (code specifying no card available; phone transaction)
POS: "Enter Amount"
Merchant input: $102.10

Along with the transaction information manually entered by the merchant, the following additional data is sent automatically by the POS terminal: MerchantID, TerminalID, TransactionType, and Amount.

As noted above, upon receiving information from the POS terminal and recognizing the transaction type, the acquirer forwards the received information to the commerce platform. Referring now to FIG. 4A, the commerce platform receives the transaction information from the acquirer at block 401 and stores it along with a unique identifier of the acquirer (AcquirerID) and the date and time at which the information is received. The commerce platform then generates a unique session ID at block 402. The session ID will be used by the consumer to identify the transaction that is desired. At block 403 the commerce platform sends the session ID to the acquirer. The acquirer then passes the session ID to the merchant's POS terminal at block 404. The session ID is then communicated to the consumer at block 405. This can be done by the POS terminal, an ancillary terminal-type device with a larger/more presentable display, and/or verbally by the merchant. The session ID can alternatively be communicated directly from the merchant's equipment to the wireless device, using a technology such as Blue Tooth, IR, or contactless chips. The method of delivery may depend upon the complexity of the session ID. For instance, if the session ID is a simple integer (such as "0321") it may be effectively communicated orally by the merchant. However, if the session ID is more complex (such as "0321-45678"), it may be more effectively conveyed to the consumer via a digital display.

The generation of the session ID and its presentation to the consumer offers the opportunity to "close the loop" and identify the consumer. This is accomplished by providing a phone application to the user, via the commerce platform, which allows the user to associate himself with the newly acquired session ID. Hence, the consumer uses the phone's browser at block 406 to navigate to a known shopping application, via the above-mentioned portal. To access the portal, the user will be prompted to enter any username and password. When prompted, the consumer inputs his PIN (as shown in FIG. 6B) and the session ID into the cellular phone at block 407, which information is transmitted to the commerce platform at block 408.

For example, the user might enter a pre-defined "buy from merchant" section of the portal and be prompted to enter the PIN and session ID. The processing flow through this application may be as follows: 1) start the phone's minibrowser; 2) log in to the portal with username and password (this establishes the user/consumer's identity); 3) navigate through various menu selections to shopping application; 4) enter PIN; and 5) enter session ID. This information is then passed to the commerce platform over a secure channel.

The commerce platform receives this information at block 409, and uses it to verify the consumer's identity at block 410. The commerce platform verifies the consumer's identify by both authenticating the consumer against the portal itself and then by verifying the consumer's PIN. (If the consumer's identity cannot be verified, the commerce platform sends an appropriate denial-of-transaction message to the cellular phone, where it is displayed to the consumer.) At block 411, the commerce platform uses the session ID received from the cellular phone to look up the transaction information which it previously received from the acquirer and stored. The session ID is the key to "closing the loop", since it is the only piece of information that is known to all parties involved. The previously stored time/date of the session ID is also evaluated at this time to ensure the session ID is still valid. (If the commerce platform is unable to locate the storage transaction information, it sends an appropriate denial of transaction message to the cellular phone, where the message is displayed to the consumer.) At block 412, the commerce platform sends to the cellular phone information indicating the details of the transaction (e.g. Merchant Name, Amount, etc.) and a prompt for the consumer either to accept or to decline the proposed transaction, where this information and prompt is displayed to the consumer. An example of what might be displayed to the consumer on the cellular phone is shown in FIG. 6A.

Assuming the consumer accepts the transaction and provides an input to the cellular phone indicating such acceptance, and acceptance signal is transmitted from the cellular phone to the commerce platform. At this point, the verification process is complete, and the process flow returns to the main process, where processing continues from block 307 in FIG. 3A.

In the commerce platform, stored along with the credit card number in the consumer's profile can also be an encrypted token that further identifies the consumer, the credit card number and type being used, and/or the authenticity of the request to the acquirer. This information may not be necessary given the nature of the transaction however (it is used in a physical credit card to prove that the card was present at the time of transaction. Since the physical "credit card" is now replaced by an interactive device in the form of a wireless device, the consumer can independently verify the transaction using his PIN and by interacting with the confirmation dialogue).

Figure 5A:
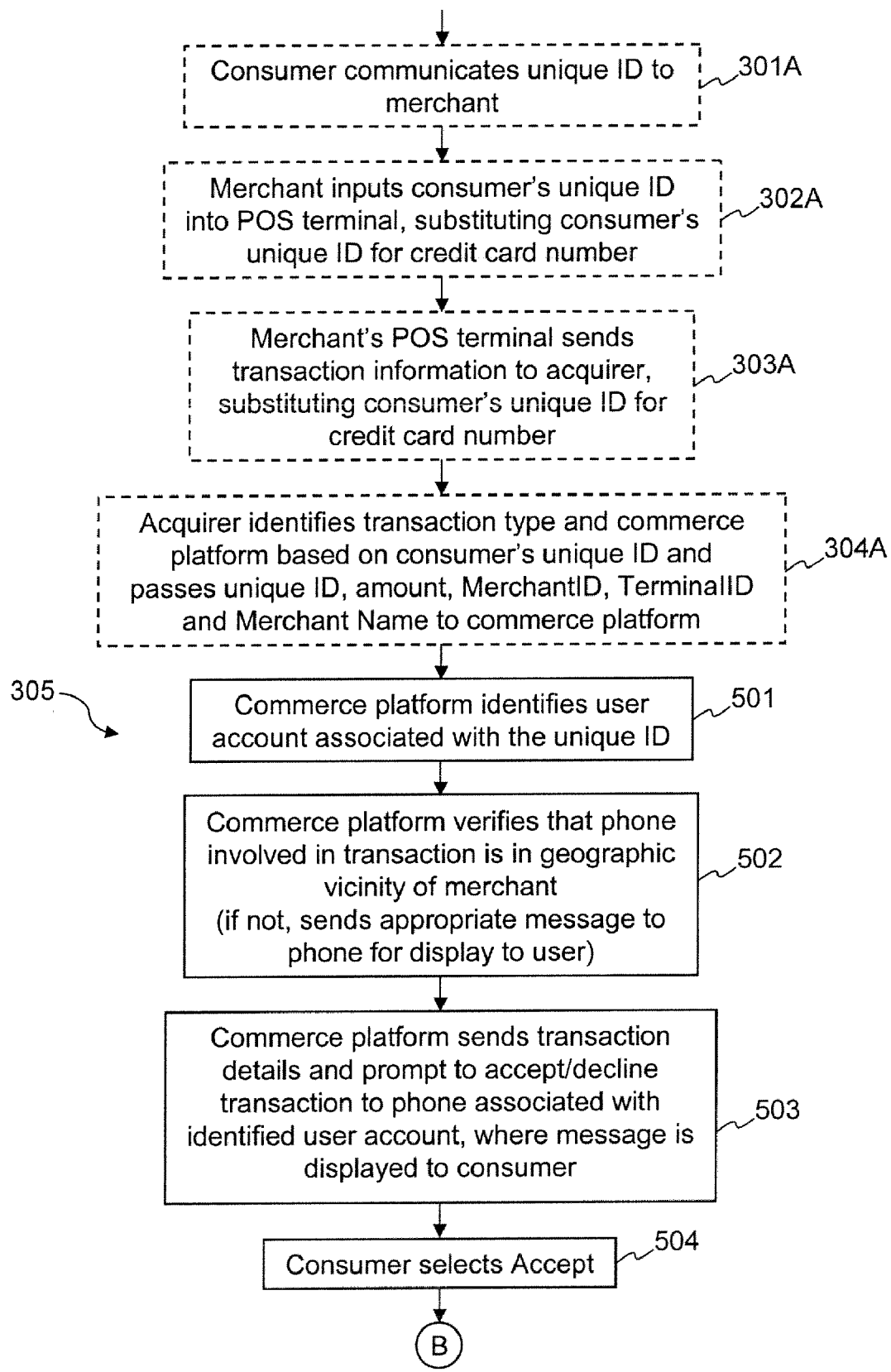
FIGS. 5A and 5B collectively form a flow diagram showing in greater detail the validation process performed by the commerce platform, according to a second embodiment.
Figure 5B:
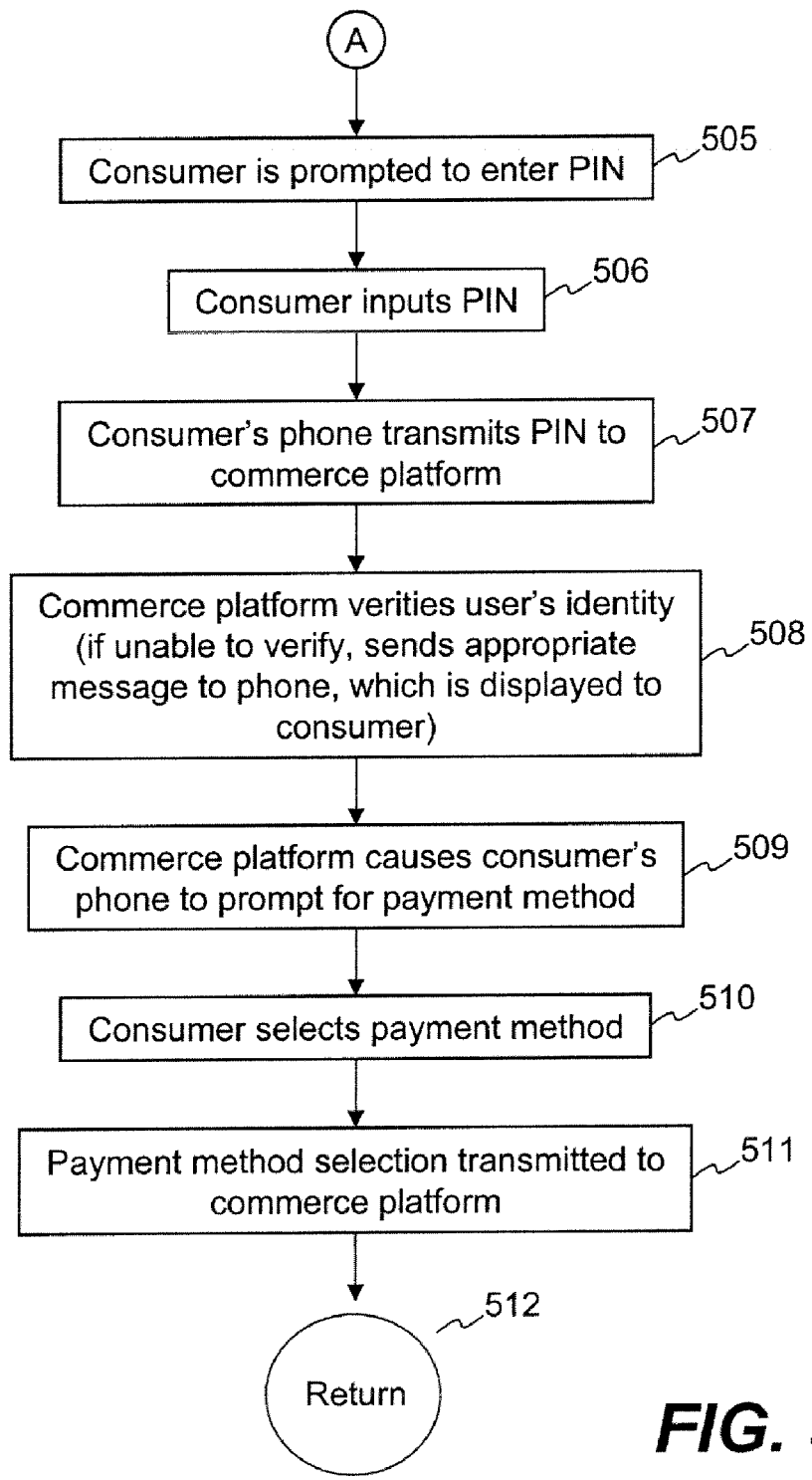

FIGS. 5A and 5B collectively show in greater detail the validation process (block 305) performed by the commerce platform, according to a second embodiment. Note that strictly speaking, blocks 301A through 304A can be considered separate from the validation process but are nonetheless included in FIG. 5A for clarity. In this embodiment, the consumer communicates a unique ID to the merchant at block 301A, to initiate the transaction. The unique ID is used to identify the transaction as a phone based transaction and may be, for example, the consumer's cellular telephone number. The unique ID can alternatively be communicated directly from the wireless device to the merchant's equipment, using a technology such as Blue Tooth, IR, or contactless chips, or by scanning a bar code on the wireless device. At block 302A, the merchant inputs the consumer's unique ID into the POS terminal, substituting the unique ID for a credit card number. At block 303A, the merchant's POS terminal sends the transaction information with the unique ID to the acquirer. At block 304A, the acquirer then identifies the transaction type as being a phone based transaction based on the unique ID, and passes the unique ID, the Amount, MerchantID, TerminalID, and Merchant Name to the commerce platform. If the commerce platform is operated by a wireless carrier, the acquirer also maps the unique ID to the appropriate wireless carrier (i.e., the appropriate commerce platform) for the consumer's cellular phone in block 304A.

The validation process (block 305) then begins with block 501 in FIG. 5A. It is assumed for this embodiment that the commerce platform is owned and/or operated by the wireless carrier associated with the consumer's cellular phone. At block 501, the commerce platform identifies the user account associated with the unique ID. At block 502, the commerce platform verifies that the phone involved in the transaction is in the same geographic area as the merchant. This can be done using standard location technology in cellular telephones and cellular telephone networks. Note that the cellular phone automatically transmits its unique identifier (handset ID) to the wireless carrier when it is turned on. If the verification of block 502 fails, an appropriate message is sent to the cellular phone, for display to the user. At block 503, the commerce platform sends the transaction details and a prompt to accept or decline the transaction to the phone associated with the identified user account, where the message is displayed to the user. Assuming the consumer accepts the transaction (using appropriate input to the cellular phone) at block 504, the consumer will next be prompted to enter his PIN at block 505. After the consumer inputs his PIN into the phone at block 506, the phone transmits the PIN to the commerce platform at block 507. At block 508, the commerce platform uses the PIN to verify the user's identity against previously established accounts. (If verification fails, an appropriate message is sent to the phone, where it is displayed to the consumer.) The commerce platform then causes the consumer's phone to prompt the consumer to indicate the method of payment at block 509. An example of such a prompt is shown in FIG. 6C. The consumer selects the method of payment at block 510, and the method of payment selection is transmitted to the commerce platform at block 511. At this point, the verification process is complete, and the process flow returns to the main process, where processing continues from block 307 in FIG. 3A. Note that, as in the previously described embodiment, there may be a time to live (TTL) associated with each transaction, which the commerce platform evaluates.

Of course, there are many possible permutations of the above-described embodiments, which may fall within the scope of the present invention. As noted above, it is not essential that the credit card information of the consumer be isolated within a trusted domain. The process of verifying the identity of the consumer may be done in a traditional manner, such that the commerce platform plays a more limited role. As one example, identification of the consumer may be accomplished using a simple identification card issued to the consumer by an authorized entity (e.g., the government). In that case, the commerce platform still serves to link the independent actions of the consumer and the merchant to a particular proposed transaction.

As another example, the consumer may be issued a credit card that references an existing portal account maintained by the commerce platform for cellular phone-based authorization. A transaction initiated by the merchant would then remain at the acquirer for a predefined TTL and await possible confirmation by the consumer by cellular phone. In this scenario, a discount could be applied to the transaction if the consumer confirms by telephone before the TTL expires, as a consequence of the reduced risk. Otherwise, the transaction could be completed as a traditional credit card transaction.

Thus, a method and apparatus for performing a credit card transaction between a merchant and a consumer using a wireless communications device have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of facilitating a credit card transaction between a consumer using a wireless communication device and a provider of a product or service, the method comprising:

in a commerce platform implemented as one or more computer systems operated by a single business entity,
storing personal information of the consumer, including a credit card number of a credit card issued to the consumer;
receiving information for requesting the transaction from a remote entity;
sending information on the transaction to the wireless communication device;
receiving a signal from the wireless communication device indicating acceptance of the transaction;
receiving a personal identification code from the wireless communication device;
using the received personal identification code and the stored personal information on the consumer to verify the identity of the consumer;
verifying that the wireless communication device is in the same geographic area as the provider;
in response to verifying the identity of the consumer and verifying that the wireless communication device is in geographic proximity to the provider, sending to a remote entity other than said single business entity a transaction request including information on the transaction and the credit card number, for initiation of a transaction approval process.

2. A method as recited in claim 1, wherein said storing personal information of the consumer comprises storing personal information of the consumer in a database within a trusted domain, the trusted domain excluding the consumer and the provider.

3. A method as recited in claim 2, wherein the stored personal information of the consumer is not permitted to pass outside the trusted domain at any time during performance of said method.

4. A method as recited in claim 1, further comprising:
receiving a signal indicating the transaction has been approved; and
in response to receiving the signal indicating the transaction has been approved,
storing a digital receipt of the transaction, and
sending a signal to the wireless communication device to cause the wireless communication device to output a message confirming completion of the transaction.

5. A method as recited in claim 1, further comprising providing telecommunications services to users of a plurality of wireless communications devices on a wireless communications network, including storing user account information for each of the plurality of users, including said consumer.

6. A method as recited in claim 5, further comprising, prior to sending information on the transaction to the wireless communication device:
receiving a unique identifier of the wireless communication device from a remote entity; and
identifying the wireless communication device and an associated user account based on the unique identifier.

7. A method of facilitating a credit transaction between a consumer and a provider of a product or service, the method comprising:
receiving information associated with the credit transaction from a remote terminal operated by the provider;
determining whether the credit transaction involves use of a personal mobile telecommunication device;
should the credit transaction be determined not to involve use of a personal mobile telecommunication device, then initiating a transaction approval process by transmitting at least a portion of the received information to a clearing network for approval of the transaction;

should the credit transaction be determined to involve use of a personal mobile telecommunication device, then
transmitting the received information to a remote validation entity other than the clearing network over a secure channel, to enable validation of the credit transaction by the remote validation entity, and
upon receiving an indication that the credit transaction has been validated by the remote validation entity, initiating a credit transaction approval process by transmitting at least a portion of the information to the clearing network for approval of the credit transaction.

8. A method as recited in claim 7, wherein the information received from the remote terminal does not include a credit card number if the transaction involves use of a personal mobile telecommunication device, such that the information transmitted to the remote validation entity does not include a credit card number, and such that the remote validation entity validates the transaction without requiring the consumer or the provider to communicate a credit card number in connection with the transaction.

9. A method as recited in claim 8, wherein the information received from the remote terminal includes a credit card number if the transaction does not involve use of a personal mobile telecommunication device.

10. A method as recited in claim 7, wherein said determining whether the transaction involves use of a personal mobile telecommunication device comprises determining whether the transaction is of the predetermined type based on the information received from the remote terminal.

11. A method as recited in claim 10, wherein said determining whether the transaction involves use of a personal mobile telecommunication device comprises determining whether the received information includes a predetermined code.

12. A method as recited in claim 10, wherein the information received from the remote terminal may include a credit card number, and wherein said determining whether the transaction involves use of a personal mobile telecommunication device comprises determining whether the information received from the remote terminal includes a predetermined code in place of a credit card number.

13. A method of a telecommunications carrier facilitating a credit card transaction between a consumer using a wireless communication device and a provider of a product or service, the method comprising:
providing telecommunications services to users of a plurality of wireless communications devices on a wireless communications network, including storing user account information for each of the plurality of users, the plurality of users including said consumer;
storing personal information of the consumer in a database within a trusted domain, the trusted domain excluding the consumer and the provider, the personal information including a credit card number of a credit card issued to the consumer;
receiving information for requesting the transaction from a remote entity, the information for requesting the transaction including a unique identifier of the wireless communication device, an amount of the transaction, and a provider identifier;
storing the information for requesting the transaction;
identifying the wireless communication device and an associated user account based on the unique identifier;
verifying that the wireless communication device is in the same geographic area as the provider;
sending information on the transaction to the wireless communication device via a wireless network;
receiving a signal from the wireless communication device indicating acceptance of the transaction by the consumer;
receiving a personal identification code from the wireless communication device via the wireless communications network;
using the received personal identification code and the stored personal information on the consumer to verify the identity of the consumer, and
if the identity of the consumer is verified, sending to a remote entity a transaction request including information on the transaction and the credit card number, for initiation of a transaction approval process, wherein the credit card information of the consumer is not permitted to pass outside the trusted domain;
receiving a signal indicating the transaction has been approved; and
in response to receiving the signal indicating the transaction has been approved,
storing a digital receipt of the transaction, and
sending a signal to the wireless communication device over the wireless communication network to cause the wireless communication device to output a message confirming completion of the transaction.

14. A method as recited in claim 13, wherein the stored personal information of the consumer is not permitted to pass outside the trusted domain at any time during performance of said method.

15. A method of facilitating a credit card transaction between a consumer and a provider of a product or service, the method comprising:
providing a computer-implemented portal, through which the consumer can remotely access a commerce application;
storing personal information of the consumer in a database within a trusted domain, the trusted domain excluding the consumer and the provider, the personal information including a credit card number of a credit card issued to the consumer;
receiving, from a remote entity within the trusted domain, information for requesting the transaction, including an amount of the transaction and a provider identifier;
storing the information for requesting the transaction;
generating a session identifier corresponding to the transaction in response to receiving the information for requesting the transaction;
associating the session identifier with the stored information for requesting the transaction;
sending the session identifier to a remote entity, for subsequent communication to the consumer;
receiving a confidential personal identification code and a user-input session identifier from a wireless communication device via a wireless communications network;
using the received personal identification code, the user-input session identifier, and the stored personal information of the consumer to attempt to validate the transaction, including
using the personal identification code and the stored personal information to verify the identity of the consumer, and
using the user-input session identifier to look up the stored information for requesting the transaction and to associate the consumer with the transaction;
if the transaction is successfully validated, then sending information on the transaction to the wireless communication device over the wireless network, to cause the wireless communication device to output a prompt to accept or decline the transaction;

receiving a signal from the wireless communication device indicating acceptance of the transaction;

in response to receiving the signal indicating acceptance of the transaction, sending to the remote entity a transaction request including information on the transaction and the credit card number, for initiation of a transaction approval process by a clearing network, without sending the credit card information outside the trusted domain;

receiving a signal indicating the transaction has been approved by the clearing network; and in response to receiving the signal indicating the transaction has been approved by the clearing network,
storing a digital receipt of the transaction in association with the identity of the consumer; and
sending a signal to the wireless communication device over the wireless communication network to cause the wireless communication device to output a message confirming completion of the transaction.

16. A method as recited in claim 15, wherein the credit card number is not permitted to pass outside the trusted domain at any time during the transaction.

17. A method as recited in claim 15, wherein said receiving information for requesting the transaction comprises receiving the information for requesting the transaction via a secure channel.

18. A method as recited in claim 15, wherein the stored digital receipt is remotely accessible to the consumer.

19. A method as recited in claim 18, wherein the stored digital receipt is remotely accessible to the consumer via said portal.

20. A processing system to facilitate credit card transaction between a plurality of consumers using wireless communication devices and a plurality of providers of products or services, the processing system comprising:

a database of personal information of the consumers, including, for each of the consumers, a credit card number of a credit card issued to said consumer;

a processor; and a memory containing instructions for execution by the processor to control the processing system to
receive information for requesting a transaction from a remote entity;
send information on the transaction to one of the wireless communication devices;
receive a signal from the wireless communication device indicating acceptance of the transaction;
receive a personal identification code from the wireless communication device;
use the received personal identification code and the stored personal information on the consumer to verify the identity of the consumer,
verifying that the wireless communication device is in the same geographic area as the provider;
in response to verifying the identity of the consumer and verifying that the wireless communication device is in geographic proximity to the provider, send to a remote entity a transaction request including information on the transaction and the credit card number, for initiation of a transaction approval process.

21. A processing system as recited in claim 20, wherein the database of personal information of the consumers is stored within a trusted domain, the trusted domain excluding the consumer and the provider.

22. A processing system as recited in claim 21, wherein the stored personal information of the consumer is not permitted to pass outside the trusted domain at any time during performance of said method.

23. A processing system as recited in claim 20, wherein the processing system is operated by a telecommunications carrier providing wireless communications services to the plurality of consumers.

24. A processing system as recited in claim 20, wherein the processing system is further configured to provide a computer-implemented portal, through which the consumer can remotely access a commerce application using the wireless communications device.

25. A processing system as recited in claim 20, wherein the processing system is further configured to:

receive a signal indicating the transaction has been approved; and in response to receiving the signal indicating the transaction has been approved,
store a digital receipt of the transaction, and
send a signal to the wireless communication device to cause the wireless communication device to output a message confirming completion of the transaction.

* * * * *